United States Patent
Valembois et al.

(10) Patent No.: US 11,858,201 B2
(45) Date of Patent: Jan. 2, 2024

(54) METHOD FOR MANUFACTURING A PART MADE FROM COMPOSITE MATERIAL

(71) Applicant: CONSEIL ET TECHNIQUE, Lauzerville (FR)

(72) Inventors: Guy Valembois, Lauzerville (FR); Nicolas-Jean Fischer, Montargis (FR); Bertrand Florentz, Paucourt (FR)

(73) Assignee: CONSEIL ET TECHNIQUE, Lauzerville (FR)

( * ) Notice: Subject to any disclaimer, the term of this patent is extended or adjusted under 35 U.S.C. 154(b) by 201 days.

(21) Appl. No.: 17/259,176

(22) PCT Filed: Jun. 4, 2019

(86) PCT No.: PCT/IB2019/054635
§ 371 (c)(1),
(2) Date: Jan. 10, 2021

(87) PCT Pub. No.: WO2019/234625
PCT Pub. Date: Dec. 12, 2019

(65) Prior Publication Data
US 2021/0154922 A1    May 27, 2021

(30) Foreign Application Priority Data

Jun. 4, 2018   (FR) ..................................... 18 54830
Jun. 4, 2018   (FR) ..................................... 18 54836

(51) Int. Cl.
*B29C 64/141*     (2017.01)
*B33Y 10/00*      (2015.01)
*B33Y 80/00*      (2015.01)

(52) U.S. Cl.
CPC ............ *B29C 64/141* (2017.08); *B33Y 10/00* (2014.12); *B33Y 80/00* (2014.12)

(58) Field of Classification Search
CPC ........ B29C 64/141; B33Y 10/00; B33Y 80/00
See application file for complete search history.

(56) References Cited

U.S. PATENT DOCUMENTS 3,479,245 A * 11/1969 Manock ................... D06B 3/10
139/421
4,100,004 A *  7/1978 Moss ........................ D01F 9/22
156/181

(Continued)

FOREIGN PATENT DOCUMENTS

DE    102008027315 A1   12/2009
GB    2082541 A          3/1982
WO    9702131 A1         1/1997

*Primary Examiner* — Nahida Sultana
(74) *Attorney, Agent, or Firm* — Craft Chu PLLC; Andrew W. Chu

(57) ABSTRACT

A method for manufacturing a part made from composite material of a thermoplastic or thermosetting matrix reinforced with fibers includes producing a structure of fibers, that is optionally pre-impregnated. The method further includes aligning and juxtaposing fibers, while stretching them between return elements, and keeping them separated from each other, so as to obtain a first layer. The method includes superimposing, on said first layer, a second layer obtained in an identical manner to the first, in which the fibers are parallel to those of the first layer and kept apart from it. The method includes repeating the superimposing operation until the desired thickness is obtained and stiffening the material making up the matrix (M) by a method that suits its nature.

9 Claims, 2 Drawing Sheets

(56) References Cited

U.S. PATENT DOCUMENTS

| | | | |
|---|---|---|---|
| 4,460,531 A | | 7/1984 | Harris et al. |
| 5,355,567 A | * | 10/1994 | Holliday ................. B29C 70/16 |
| | | | 264/257 |
| 5,820,615 A | * | 10/1998 | Koczab ................... B32B 27/36 |
| | | | 28/107 |
| 10,424,001 B1 | * | 9/2019 | Mishra .................... B22F 10/85 |
| 2004/0102754 A1 | * | 5/2004 | Morman ........... A61F 13/49015 |
| | | | 604/385.24 |
| 2005/0124961 A1 | * | 6/2005 | Morman ........... A61F 13/49019 |
| | | | 604/385.24 |
| 2017/0156445 A1 | * | 6/2017 | Guest ...................... B29C 64/30 |

* cited by examiner

METHOD FOR MANUFACTURING A PART MADE FROM COMPOSITE MATERIAL

CROSS-REFERENCE TO RELATED APPLICATIONS

See Application Data Sheet.

STATEMENT REGARDING FEDERALLY SPONSORED RESEARCH OR DEVELOPMENT

Not applicable.

THE NAMES OF PARTIES TO A JOINT RESEARCH AGREEMENT

Not applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not applicable.

STATEMENT REGARDING PRIOR DISCLOSURES BY THE INVENTOR OR A JOINT INVENTOR

Not applicable.

BACKGROUND OF THE INVENTION

1. Field of the Invention

The object of the present invention is a method for manufacturing a part made of composite material comprising a fiber-reinforced thermoplastic or thermosetting matrix, as well as the composite part so obtained.

2. Description of Related Art Including Information Disclosed Under 37 CFR 1.97 and 37 CFR 1.98

It should be noted that the term "fibers" is understood to mean all the forms in which the reinforcing fibers can be present, and namely, but non-restrictively, strands or cords of reinforcing fibers.

The thermoplastic or thermosetting matrix of a part made of composite material, in which the reinforcing fibers are embedded, constitutes the weak point, and which generally consists of a resin, of said part because it has a specific strength much lower than that of the fibers. The way a composite part breaks is usually a breaking of the resin that binds the fibers.

Therefore the right design of a composite part takes this phenomenon into consideration and favors a transmission of the forces by the pure application of a tensile or compressive force to the fibers, which results into not stressing the resin. Hence, during the design and manufacture of parts made of composite material, one seeks to orient the fibers in the direction of the forces or in similar directions.

Furthermore, in order to optimize the mechanical strength of the part to be made, it is also necessary to prevent the fibers from being pleated or being non-rectilinear, and one therefore seeks to achieve a perfect straightness of the fibers.

This straightness is generally obtained by tensioning the fiber, for example by being stretched between two return means. This is how a winding of pre-impregnated fibers around two distant axes is commonly carried out, to make a skein, as shown in FIG. 1.

However, though the fibers remain perfectly straight after a few windings, it is not the same after a large number of windings, because an abundance of the fibers is observed, which leads to an increase in thickness at the level of the axes, a transverse swelling in the median portion, and a filling of the space between the axes, associated with a folding of the fibers in this area, so that the fibers are no longer rectilinear.

From GB 2082541 it is known to make a composite panel comprising reinforcing fibers, which are wound around fixing points arranged on a template, in addition some of these fibers pass alternately under and then above transverse bars, which ensure the tension and the thickness volume of the panel to be manufactured. Though the transverse bars permit the fibers to be tensioned, this tension does not permit a perfect straightness of the fibers since the latter are also wound several times on the fixing points of the template, as for the skein in FIG. 1.

BRIEF SUMMARY OF THE INVENTION

One of the aims of the present invention is to provide a method for manufacturing a part made of composite material, comprising a fiber-reinforced thermoplastic or thermosetting matrix, which permits to cope with the aforementioned drawbacks, by optimizing the orientation and especially the straightening of the fibers within said part.

Another aim of the present invention is to provide a method, which can be automated, knowing that the production of a part made of composite material still requires too many human interventions, which is economically detrimental.

The method for manufacturing a part made of composite material according to the invention, comprising a fiber-reinforced thermoplastic or thermosetting matrix, and in which said fibers are wound between return elements and tensioned, is characterized in that it consists in previously producing a structure of fibers, whether or not pre-impregnated, by means of the following operations:

- aligning and juxtaposing fibers, while stretching them between return elements, and keeping them spaced apart from each other, so as to obtain a first layer,
- superimposing on said first layer, a second layer obtained in a manner identical to the first one, where the fibers are parallel to those of the first layer, and kept apart from the latter,
- repeating the superposition operation until the desired thickness is obtained,
- stiffening the material constituting the matrix, by means of a method specific to its nature.

It should be noted that the term stiffening is used in a general manner, this can be for example, non-restrictively, a polymerization, a cooling for the thermoplastic strands or threads deposited by reflow, the evaporation of the solvent of an adhesive deposited in spray, the spraying of water on the fibers to cause the lubrication of the fibers to migrate to the intersection of fibers and to create a slight overall cohesion.

Each of the fibers is thus kept perfectly straight, without any incidence on the tensioning of the neighboring fibers.

It is known that in constructions that only work in traction/compression, the compression is always the problem in the first place, because of buckling. The way of separating the fibers, according to the invention, permits to increase their resistance to compressive buckling by increasing the inertia of the "elementary beams" obtained in such a mesh structure.

It should be noted that, advantageously, the return elements can be inside the part made of composite material, and that they can therefore be intended to be embedded into the matrix.

According to an additional feature of the method according to the invention, a spacing dead turn around the return elements is performed, in order to re-parallelize the fibers.

A dead turn consists of a full turn around a return element, rather than a simple loop.

According to another additional feature of the method according to the invention, the distance between the different layers is created by interposing elements therein.

According to another particular embodiment of the method according to the invention, the interposed elements consist of spacers deposited in a robotic manner.

According to another particular embodiment of the method according to the invention, the intercalated elements consist of spacers deposited by means of an additive manufacturing method.

According to another particular embodiment, the layers are superposed while maintaining a distance between them with respect to the neighboring one by means of spacers obtained through an additive manufacturing method.

According to a particular embodiment of the method according to the invention, the layers are superimposed while maintaining a distance between them with respect to the neighboring one, by interposing a layer of aligned and juxtaposed fibers extending in a direction different from that of the layer or layers, which it is into contact with.

According to another additional feature of the method according to the invention, the welding of the intersecting fibers is carried out by means of a second resin.

This welding, by the deposition of this second resin, in one operation, non-restrictively molding, casting, dipping, permits to increase the resistance to buckling of the strands constituting the mesh being made.

According to another additional feature of the method according to the invention, the fibers are previously covered individually with a thermoplastic or thermosetting material so as to form a sheath the thickness of which is capable of creating the distance between the juxtaposed and/or superimposed fibers.

According to a variant of the method according to the invention, several fibers kept parallel and separated by pairs are covered with a thermoplastic or thermosetting material so as to form a sheath the thickness of which is capable of ensuring the distance between the juxtaposed and/or superimposed fibers.

BRIEF DESCRIPTION OF THE SEVERAL VIEWS OF THE DRAWINGS

The advantages and features of the method for manufacturing a part made of composite material according to the invention will become more evident from the following description, which relates to the attached drawing, which represents a non-restrictive embodiment of same.

DETAILED DESCRIPTION OF THE INVENTION

Figure 1:
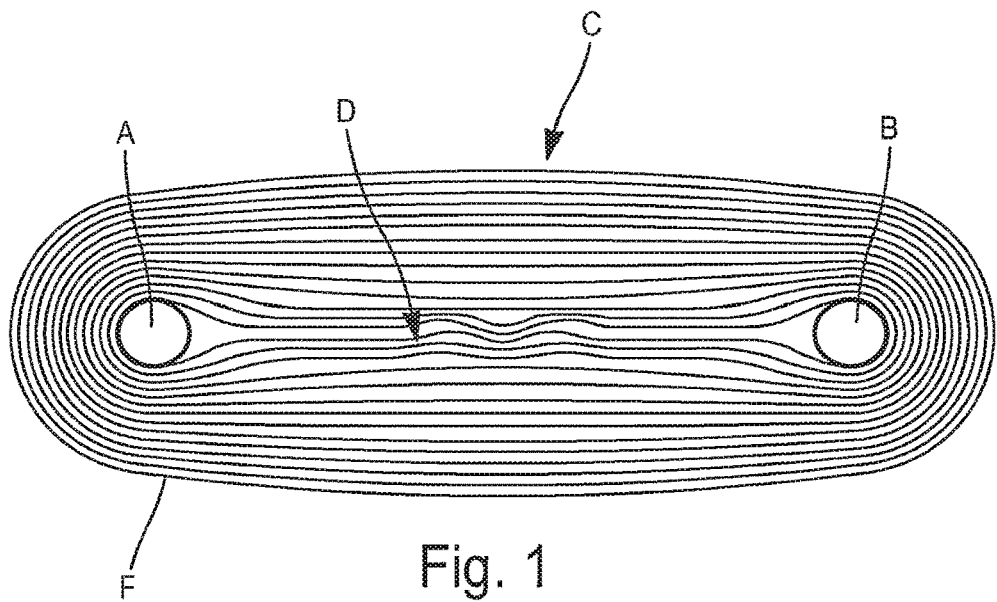
FIG. 1 shows a schematic view of a filament winding illustrating the prior art.

FIG. 1 shows a step of a usual method for manufacturing a part made of composite material. Thus, the method consists in making a skein E by winding pre-impregnated fibers F on two axes A and B. Though theoretically the fibers are stretched between the two axes, in reality we observe an increase in thickness at the level of the axes A and B, and especially a transverse swelling in the median portion C and a filling of the space D between the axes A and B, associated with a folding of the fibers F in this area. Therefore, such a method does not permit to achieve the desired goal, namely that the fibers F are rectilinear, in order to be capable of being stressed not only in traction, but also in compression.

As already mentioned, the term "fibers" is understood to mean all the forms in which the reinforcing fibers can be present, and namely, but non-restrictively, strands or cords of reinforcing fibers.

Figure 2:
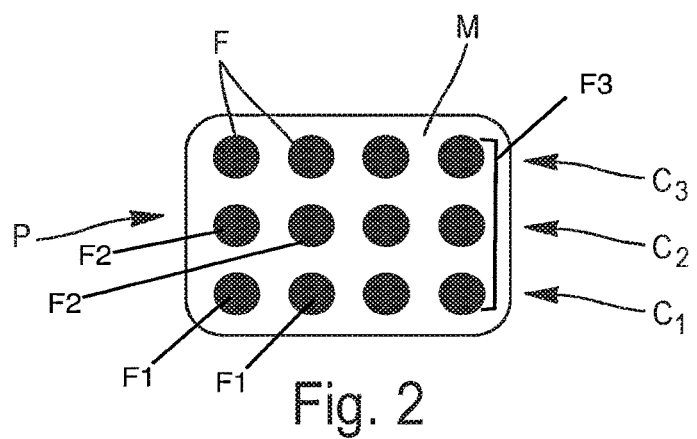
FIG. 2 shows a schematic view of a cross-section of a portion of a part made of composite material produced by means of the manufacturing method according to the invention.

When referring now to FIG. 2, we can see a cross-section of a portion of a part P made by means of the method according to the invention.

This part P includes a matrix M into which reinforcing fibers F are embedded. The method according to the invention consists in arranging the fibers F so that they are kept aligned, parallel to each other and especially perfectly rectilinear.

To achieve this goal, the fibers are aligned and juxtaposed to form a layer, which is in turn covered with another layer.

It should be noted that the terms "layer" and "superposition" are not restrictive, they do not involve a mandatory orientation, they are used for ease of understanding.

In FIG. 2, the portion of the composite part being shown includes three superimposed layers, C1, C2 and C3 of four fibers F (first layer fibers F1, second layer fibers F2, etc.) each.

The layer C1 is obtained by stretching four fibers F (first layer fibers F1) between return means, not shown, while keeping them spaced apart from each other.

The layer C2 is made on top of the layer C1, at a distance from the latter, and in the same way, namely by tensioning the fibers F between return means, and the same applies for layer C3.

According to this embodiment, the distance between two successive layers is obtained by means of return means specific to each layer.

After the construction of such a structure F3 of fibers F, it is embedded into the matrix M, through various known means, such as, non-restrictively, dipping, molding, casting, infusion, spraying.

Figure 3:
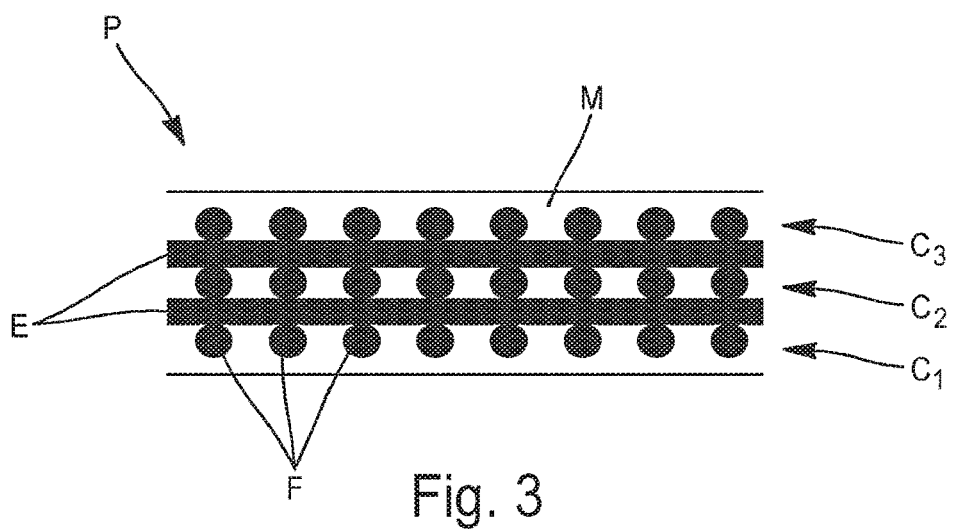
FIG. 3 shows a schematic view of a variant of the same manufacturing method.

When referring now to FIG. 3, it can be seen that according to a variant of the method according to the invention, maintaining the distance between two successive layers can be achieved not through return means specific to each layer, but through depositing spacer elements E between each of them.

The spacer means E can be of different types, they can consist, non-restrictively, of fibers arranged in a direction different from those of the layers C1, C2 and C3, or of the resin, identical to the one the matrix M is comprised of.

It should be noted that, for the purpose of automating the manufacturing method according to the invention, the spacer elements E can advantageously be deposited between each layer by means of an additive manufacturing method.

Figure 4:
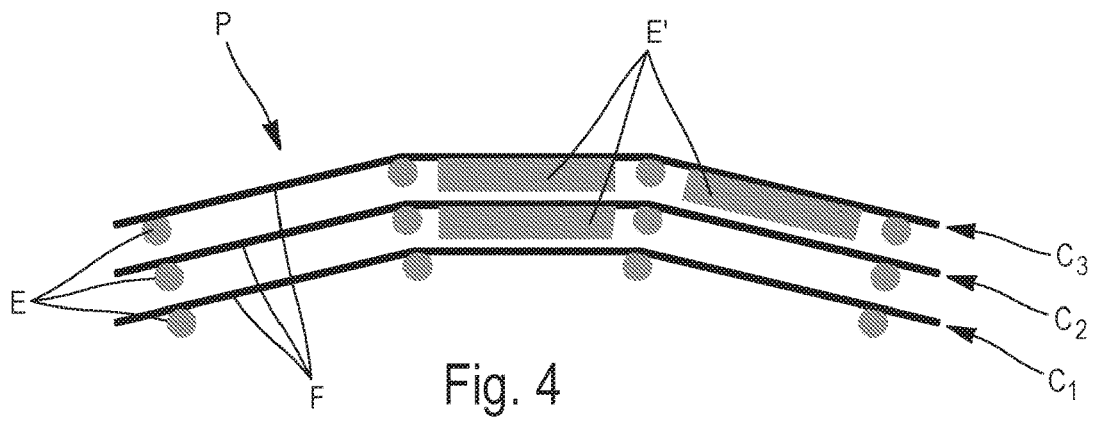
FIG. 4 shows a schematic view of another variant of the same manufacturing method.

When referring to FIG. 4, we can see another variant of implementation of the method according to the invention, in which the particular positioning of the spacer elements E supporting the same layer C1, C2 or C3 of fibers F permits a shaping of each of these layers C1, C2 or C3, so as to provide them for example with a curved shape.

In the embodiment being shown, it should be noted that the spacer elements E can consist of fibers, while other spacer elements E' are arranged both between the layers C1, C2 or C3, and between the spacers E.

Figure 5:
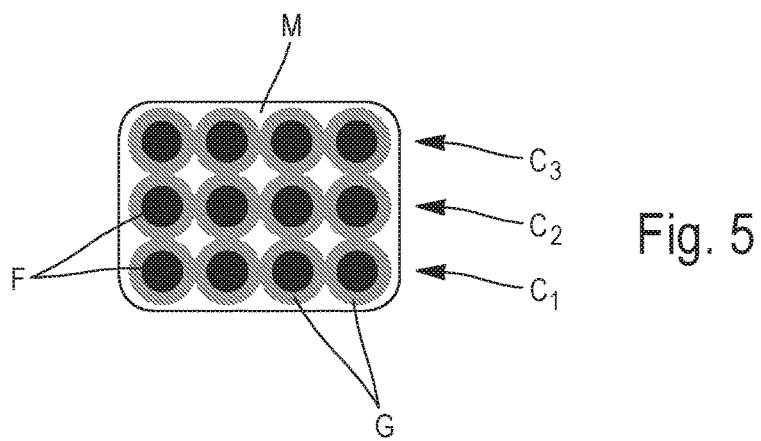
FIG. 5 shows the same schematic view of a part made of composite material produced according to a variant of the same method.

FIG. 5 shows another variant of implementation of the method according to the invention. In this variant, F fibers, or more particularly strands, coated with a thermoplastic or thermosetting material are used so as to form around each of them a sheath G with a chosen thickness.

When making the layers C1, C2 and C3, the sheaths G permit to maintain the distance between the fibers F of the same layer, but also between the fibers of two successive layers.

According to this variant, since maintaining the distance between the fibers is obtained by means of the sheaths G, then only remains to ensure the tension of the fibers.

It is also possible to provide several fibers arranged in parallel and regularly spaced from each other two by two, the whole being surrounded by a single sheath forming spacer means.

Figure 6:
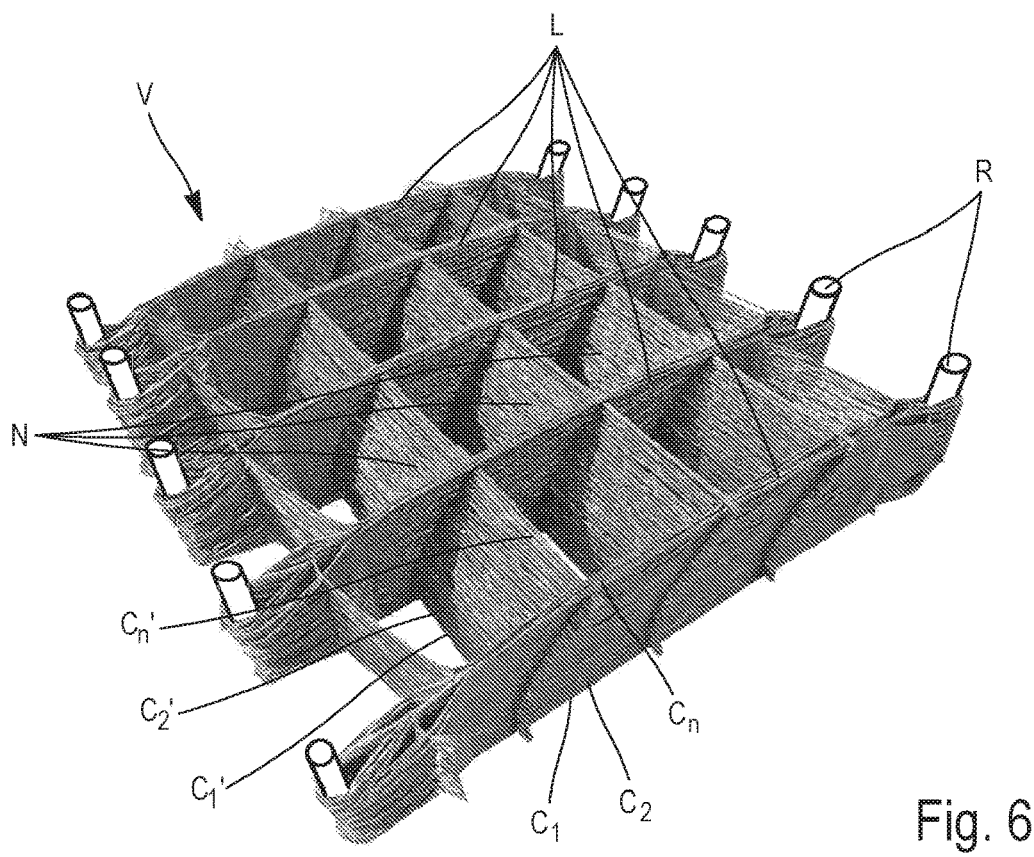
FIG. 6 shows a perspective view of a step of the same method during the manufacture of a part made of composite material.

FIG. 6 shows the fiber structure F of a part V made of composite material, before the operation of associating the matrix M.

The manufacture of this part V is similar to the method shown in FIG. 4.

Part V is made of the intersection of parallel walls L and N, where the walls L are flat, while the walls N are curved around a longitudinal axis perpendicular to the walls L.

The walls L consist of the superposition of layers C1, C2 . . . Cn, each formed of juxtaposed fibers F, kept apart from each other through their tension on return means R, in this case pins, while between each layer C1, C2 . . . Cn is interposed a layer C'1, C'2 . . . C'n of fibers F, spaced apart from each other, stretched over return means, not shown, permitting to perform, through a progressive offset, the curved shaping of the walls N.

Irrespective of the mode of implementation of the method according to the invention, the desired goal is achieved, namely the straightness of the fibers, which allows optimum tensile as well as compressive strength.

On the other hand, the method according to the invention is perfectly automatable, which constitutes another aim of the invention.

We claim:

1. A method for manufacturing composite material, comprising the steps of:
   stretching fibers between return elements in a first direction so as to obtain a first layer of aligned, juxtaposed and spaced apart first layer fibers;
   stretching fibers between return elements in said first direction so as to obtain a second layer of aligned, juxtaposed and spaced apart second layer fibers;
   superimposing said second layer on said first layer with the first layer fibers parallel to the second layer fibers so as to obtain a structure of fibers, said second layer being separated from said first layer in a second direction perpendicular to said first direction;
   repeating the steps of stretching fibers and superimposing so as to obtain said structure of fibers of a desired thickness; and
   stiffening a matrix around said structure of fibers with said first layer fibers parallel to said second layer fibers so as to form a composite material.

2. The manufacturing method, according to claim 1, wherein the step of stretching fibers between return elements in said first direction so as to obtain said first layer is comprised of: performing a dead spacer turn around said return elements so as to re-parallelize said first layer fibers in said first layer.

3. The manufacturing method, according to claim 1, further comprising the step of: interposing elements between said first layer and said second layer so as to set a distance between said first layer and said second layer.

4. The manufacturing method, according to claim 3, wherein the elements between said first layer and said second layer are comprised of spacers, and wherein the step of interposing elements is comprised of interposing elements between said first layer and said second layer with a robot.

5. The manufacturing method, according to claim 3, wherein the elements between said first layer and said second layer are comprised of aligned and juxtaposed fibers of an interposed layer, the aligned and juxtaposed fibers extending in a direction different from said first direction.

6. The manufacturing method, according to claim 5, further comprising the step of: welding of the aligned and juxtaposed fibers by a second resin.

7. The manufacturing method, according to claim 1, further comprising the step of: covering said fibers individually with a thermoplastic or thermosetting material, before the step of stretching fibers between return elements in said first direction so as to obtain said first layer, so as to form a sheath on each fiber, said sheath having a sheath thickness setting a distance between said first layer and said second layer and between each fiber.

8. The manufacturing method according to claim 1, wherein the step of stretching fibers between return elements in said first direction so as to obtain said first layer is comprised of the steps of:
   arranging sets of two fibers together, each set of two fibers being parallel and spaced apart from an adjacent set of two fibers; and
   covering each set of two fibers with a thermoplastic or thermosetting material so as to form a sheath on each set of two fibers, said sheath having a sheath thickness setting a distance between said first layer and said second layer and between each set of two fibers.

9. A component, comprising:
   a part of said composite material, according to claim 1.

* * * * *